United States Patent [19]

Blount

[11] 3,962,067

[45] June 8, 1976

[54] PROCESS FOR THE PRODUCTION OF AN AQUEOUS SOLUTION OF SILICOFORMIC ACID

[76] Inventor: David H. Blount, 5450 Lea St., San Diego, Calif. 92105

[22] Filed: Sept. 4, 1975

[21] Appl. No.: 610,272

Related U.S. Application Data

[63] Continuation-in-part of Ser. No. 477,861, June 10, 1974.

[52] U.S. Cl. ............................. 252/182; 106/288 B; 252/313 S; 423/325; 423/331; 423/332

[51] Int. Cl.$^2$ .................. C01B 33/12; C01B 33/18; C01B 33/00

[58] Field of Search ......................... 252/182, 313 S; 423/325, 326, 331, 332, 336; 106/288 B

[56] References Cited

UNITED STATES PATENTS

| | | | |
|---|---|---|---|
| 1,129,320 | 2/1915 | Vail et al. ............................ | 423/326 |
| 3,473,890 | 10/1969 | Reinhardt et al. ................... | 423/332 |
| 3,674,430 | 7/1972 | Illigen et al. ......................... | 423/325 |
| 3,826,814 | 7/1974 | Illigen et al. ......................... | 423/335 |

OTHER PUBLICATIONS

Iler, "The Colloid Chemistry of Silica and Silicates," Cornell U. Press, 1955, p. 91.

Haekh's Chemical Dictionary, McGraw–Hill, 1969, pp. 387, 610, 611.

*Primary Examiner*—Benjamin R. Padgett
*Assistant Examiner*—Irwin Gluck

[57] ABSTRACT

Silicoformic acid granules will go into solution when mixed in a dilute aqueous solution of an alkali metal hydroxide or an alkali metal salt of a weak acid.

5 Claims, No Drawings

PROCESS FOR THE PRODUCTION OF AN AQUEOUS SOLUTION OF SILICOFORMIC ACID

CROSS-REFERENCE TO RELATED CO-PENDING APPLICATION

This application is a continuation-in-part of U.S. Pat. application Ser. No. 477,861, filed June 10, 1974; the applicant is David H. Blount, M.D.

BACKGROUND OF THE INVENTION

This invention relates to a process for the producion of an aqueous solution of silicoformic acid by adding the silicoformic acid to an aqueous solution containing an alkali metal hydroxide or an alkali metal salt of a weak acid; the silicoformic acid goes into solution rapidly when the dilute alkali solution is heated to 60°–100° C.

The silicoformic acid may be produced by the chemical reaction of a dry alkaline metal metasilicate with a mineral acid, or a hydrogen salt. Silicoformic acid, also known, as monosilanic acid, may be produced by other methods such as those disclosed in U.S. Pat. No. 3,674,430.

Silicoformic acid aqueous solutions may be used as coating agents and adhesives, as a filler in elastomers, resins, molding powders and pigments, as a vehicle for insecticides and aromatics, in the polymerization of many plastics, elastomers and natural products. Silicoformic acid aqueous solution may be mixed with emulsions of poly(vinyl chloride), polyacrylate, polymethacrylate, polymethylmethacrylate, polyacrylonitrile, polystyrene, poly(vinyl alcohol), natural proteins, polyamides, sodium cellulose and other organic compounds to be used as coating agents, adhesives and molding powders.

Silicoformic acid in an aqueous solution may be mixed with aqueous emulsions of organic polymers, natural polymers, rubber latex and natural proteins, then neutralized to a pH of about 8–9 by an acetic compound; the silicoformic acid will gel and form a finely dispersed filler. Silicoformic acid in an aqueous solution, may be co-polymerized with many organic compounds by a peroxide.

An alkali aqueous solution may be added to an acetic solution with a pH below 5.5; it will remain in solution for several hours, then slowly gel. The acetic solution may be mineral acids or organic acids which are water soluble.

SUMMARY OF THE INVENTION

I have discovered that silicoformic acid is soluble in a dilute alkali aqueous solution containing an alkali metal hydroxide or an alkali metal salt of a weak acid. The rapidity by which silicoformic acid goes into solution is increased by elevating the temperature; at 60°–100° C it rapidly goes into solution. The most useful alkali metal hydroxides are sodium hydroxide and potassium hydroxide. The most useful alkali metal salts are sodium silicate and sodium silicoformate, but many other alkali metal salts of weak acids may be used such as potassium silicate, potassium silicoformate, sodium polyacrylate, potassium polyacrylate, sodium polymethacrylate and potassium polymethacrylate.

Silicoformic acid is also soluble in organic solutions which contain an alkali metal hydroxide such as alcohols, glycerols and glycols.

DETAILED DESCRIPTION OF THE INVENTION

The method of this invention is to add silicoformic acid to a warm dilute alkali aqueous solution while agitating until the silicoformic acid will not go into solution any more. The undissolved silicoformic acid settles to the bottom, and the aqueous solution of silicoformic acid is removed. When a sodium hydroxide aqueous solution is used, silicoformic acid will go into solution until the ratio of silicoformic acid and sodium hydroxide is about 5:1. Sodium hydroxide is the preferred alkali metal hydroxide. Sodium metasilicate is the preferred alkali metal salt of a weak acid.

DESCRIPTION OF PREFERRED EMBODIMENTS

My invention will be illustrated in greater detail in the following Examples which describe various preferred embodiments of the process of this invention. These Examples are merely illustrative of my novel processes and do not limit the procedures which may be used in the production of my novel aqueous solution of silicoformic acid. Parts and percentages are by weight unless otherwise indicated.

EXAMPLE I

About 3 parts by weight of sodium hydroxide and about 14 parts by weight of silicoformic acid are added to about 20 parts by weight of water; the mixture is then heated to about 80°–100° C while stirring, and the silicoformic acid goes into solution in about 10–20 minutes, thereby producing a clear thick aqueous solution of silicoformic acid. The said solution may be diluted with water to the desired concentration.

EXAMPLE II

About 2 parts by weight of dry sodium metasilicate and about 3 parts by weight of silicoformic acid are added to about 20 parts by weight of water; the mixture is then heated to about 60°–100° C while stirring, and the silicoformic acid goes into solution rapidly, thereby producing a clear aqueous solution of silicoformic acid. The said solution may be further diluted with water if desired.

EXAMPLE III

About 10 parts by weight of silicoformic acid and about 4 parts by weight of sodium silicoformate are added to about 50 parts by weight of water; the said mixture is heated to about 50°–90° C, and the silicoformic acid goes into solution in about 10–20 minutes, thereby producing a clear aqueous solution of silicoformic acid.

EXAMPLE IV

About 4 parts by weight of silicoformic acid and about 1 part by weight of potassium hydroxide are added to about 10 parts by weight of water; the mixture is agitated, and the silicoformic acid slowly goes into solution, thereby producing a clear, thick aqueous solution of silicoformic acid. The said solution may be diluted with water to the desired concentration.

EXAMPLE V

About 4 parts by weight of granular silicoformic acid and about 1 part by weight of sodium hydroxide are added to about 30 parts by weight of water at a temperature of 25°–35° C. The said mixture is stirred, and the silicoformic acid goes into solution in about 2-4 hours.

Although certain specific preferred ingredients and conditions are described in conjunction with the above detailed description of the Invention and Examples, these may be varied and other ingredients may be used where suitable, with similar results. Other applications, modifications and ramifications of this invention will occur to those skilled in the art upon reading this disclosure. These are intended to be included within the scope of this invention, as defined in the appended claims.

I claim:

1. The method of preparing an aqueous solution of silicoformic acid by the steps of:
   a. mixing together silicoformic acid and an alkali metal hydroxide in the ratio of about 5:1 by weight in an aqueous solution,
   b. heating the said mixture to about 60°–100° C,
   c. stirring the said mixture for about 10–20 minutes, thereby
   d. preparing an aqueous solution of silicoformic acid.

2. The method according to claim 1 wherein the alkali metal hydroxide is sodium hydroxide.

3. The method according to claim 1 wherein the alkali metal hydroxide is potassium hydroxide.

4. The method according to claim 1 wherein the alkali metal hydroxide is replaced with sodium metasilicate and mixed with silicoformic acid in an aqueous solution in the ratio of about 2:3 by weight.

5. The method according to claim 1 wherein the alkali metal hydroxide is replaced with sodium silicoformate and mixed with silicoformic acid in an aqueous solution in the ratio of about 2:5 by weight.

* * * * *